(12) United States Patent
Sackmann et al.

(10) Patent No.: US 11,691,151 B2
(45) Date of Patent: *Jul. 4, 2023

(54) SYSTEMS AND METHODS FOR TAGGING AND ACOUSTICALLY CHARACTERIZING CONTAINERS

(71) Applicant: Labcyte Inc., San Jose, CA (US)

(72) Inventors: Eric Sackmann, Oakland, CA (US); Sammy Datwani, Pleasanton, CA (US); Stephen Hinkson, San Carlos, CA (US)

(73) Assignee: Labcyte Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,585

(22) Filed: Nov. 8, 2021

(65) Prior Publication Data

US 2022/0062907 A1    Mar. 3, 2022

Related U.S. Application Data

(63) Continuation of application No. 16/705,807, filed on Dec. 6, 2019, now Pat. No. 11,192,114, which is a
(Continued)

(51) Int. Cl.
*B01L 3/00* (2006.01)
*B01L 3/02* (2006.01)
(Continued)

(52) U.S. Cl.
CPC ............ *B01L 3/545* (2013.01); *B01L 3/0268* (2013.01); *B01L 3/56* (2013.01); *G01N 29/028* (2013.01); *G01N 29/043* (2013.01); *G01N 29/07* (2013.01); *G01N 29/09* (2013.01); *G01N 29/4409* (2013.01); *B01J 2219/00378* (2013.01); *B01L 2300/021* (2013.01); *B01L 2300/0829* (2013.01); *B01L 2300/0851* (2013.01); *B01L 2400/0439* (2013.01);
(Continued)

(58) Field of Classification Search
CPC .............. B01L 3/545; B01L 2300/021; B01L 2300/0829; B01L 2300/0851; B01L 3/0268; B01L 3/56; B01L 2400/0439; G01N 29/028; G01N 29/07; G01N 29/09; G01N 29/4409; G01N 2291/011; G01N 2291/018; G01N 2291/0235; G01N 2291/2695; G01N 29/043; G01N 2291/101; B01J 2219/00378
USPC ......................................................... 73/589
See application file for complete search history.

(56) References Cited

U.S. PATENT DOCUMENTS 3,733,889 A   5/1973  Proctor, Jr.
3,958,451 A   5/1976  Richardson
(Continued)

FOREIGN PATENT DOCUMENTS

EP    1209467 A1    5/2002
JP    04116585 A1   4/1992
(Continued)

*Primary Examiner* — Lisa M Caputo
*Assistant Examiner* — Rose M Miller
(74) *Attorney, Agent, or Firm* — Dianne E. Reed; VLP Law Group LLP

(57) ABSTRACT

Embodiments of the present invention provide systems and methods for tagging and acoustically characterizing containers.

17 Claims, 7 Drawing Sheets

Related U.S. Application Data continuation of application No. 15/289,692, filed on Oct. 10, 2016, now Pat. No. 10,766,027.

(60) Provisional application No. 62/240,412, filed on Oct. 12, 2015.

(51) Int. Cl.
*G01N 29/07* (2006.01)
*G01N 29/44* (2006.01)
*G01N 29/04* (2006.01)
*G01N 29/09* (2006.01)
*G01N 29/028* (2006.01)

(52) U.S. Cl.
CPC .. *G01N 2291/011* (2013.01); *G01N 2291/018* (2013.01); *G01N 2291/0235* (2013.01); *G01N 2291/101* (2013.01); *G01N 2291/2695* (2013.01)

(56) References Cited

U.S. PATENT DOCUMENTS

| | | |
|---|---|---|
| 4,309,904 A | 1/1982 | Jones et al. |
| 5,029,476 A | 7/1991 | Metala et al. |
| 5,608,199 A | 3/1997 | Clouse, III et al. |
| 11,192,114 B2 * | 12/2021 | Sackmann ........... G01N 29/028 |
| 2005/0092091 A1 | 5/2005 | Greelish |
| 2012/0288890 A1 | 11/2012 | Oouchi |
| 2013/0327827 A1 | 12/2013 | Lautzenhise et al. |
| 2015/0125952 A1 | 5/2015 | Kim et al. |
| 2015/0157011 A1 | 6/2015 | Dutscher et al. |
| 2015/0196904 A1 | 7/2015 | Ellson |
| 2015/0197372 A1 | 7/2015 | Majlof et al. |

FOREIGN PATENT DOCUMENTS

| | | |
|---|---|---|
| JP | 04313096 A1 | 11/1992 |
| JP | 2008519863 A1 | 5/2008 |
| JP | 2012150072 A1 | 8/2012 |
| WO | 03/042668 A2 | 5/2003 |
| WO | 2015108807 A1 | 7/2015 |

* cited by examiner

SYSTEMS AND METHODS FOR TAGGING AND ACOUSTICALLY CHARACTERIZING CONTAINERS

CROSS REFERENCE TO RELATED APPLICATION

This application is a continuation of U.S. patent application Ser. 16/705,807, filed Dec. 6, 2019, which is a continuation of U.S. patent application Ser. 15/289,692, filed Oct. 10, 2016, which claims the benefit of U.S. Provisional Patent Application No. 62/240,412, filed Oct. 12, 2015, and all entitled "Systems and Methods for Tagging and Acoustically Characterizing Containers," the entire contents of all applications are incorporated by reference herein.

FIELD

This application relates to tagging containers, such as containers formed using injection molding. But it will be appreciated that the invention has a much broader range of applicability.

BACKGROUND

Injection molding is a ubiquitous, high-throughput manufacturing process, whereby parts can be molded at substantial scale while extending design and functional consistency across many parts. The injection molding process consists of a mold with one or more cavities that contains the shape, geometry, and design features for the part; a "gate" that allows for the molten plastic to be injected into individual cavities within the mold; ejection pins to allow for removal of the part from the mold; and various processing parameters such as holding time, temperature, melt mass-flow rate, packing pressure, etc. that affect the conformation and solidification of the molten plastic within the mold. In order to increase the speed, scale, and efficiency at which parts can be molded, manufacturers often employ multi-cavity molds, where each cavity replicates the part such that multiple parts can be generated per molding cycle.

SUMMARY

This application relates to tagging containers, such as containers formed using injection molding. These tags can be associated with information used to identify the origin of the container and associated, retrievable predetermined physical properties useful in both acoustic auditing of the container contents and ejection of materials from the container by acoustic droplet ejection (ADE). But it will be appreciated that the invention has a much broader range of applicability.

Under one aspect, a container configured to hold a fluid includes at least one vertical sidewall; and a bottom coupled to the at least one vertical sidewall, the bottom being configured to receive an acoustic signal, the bottom including a plurality of recesses, grooves, or protrusions thereon or therein so as to provide a plurality of times of flight of the acoustic signal through the bottom.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase or decrease the amplitude of reflection of the acoustic signal. For example, in some embodiments, the plurality of recesses, grooves, or protrusions include a hydrophobic micropillar array.

In some embodiments, the plurality of recesses, grooves, or protrusions are configured so as to be located outside of an acoustic path between the fluid and an acoustic transducer generating the acoustic signal. In some embodiments, the plurality of recesses, grooves, or protrusions are configured so as to be located along and within an acoustic path between the fluid and an acoustic transducer generating the acoustic signal.

In some embodiments, the container includes a multiwell plate, a vertical sidewall of the at least one vertical sidewall and the bottom corresponding to a single well of the multiwell plate.

In some embodiments, the sidewall and the bottom include a plastic. In some embodiments, the plastic is selected from the group consisting of cyclic olefin polymer, cyclic olefin copolymer, polypropylene, and polystyrene.

Under another aspect, a container configured to hold a fluid includes at least one vertical sidewall; and a bottom coupled to the at least one vertical sidewall, the bottom being configured to receive an acoustic signal, the bottom including a thickness selected such that the container is identifiable based on a time of flight of the acoustic signal through the bottom.

Under yet another aspect, a method of characterizing a container configured to hold a fluid includes providing the container. The container can include at least one vertical sidewall; and a bottom coupled to the at least one vertical sidewall, the bottom being configured to receive an acoustic signal, the bottom including a plurality of recesses, grooves, or protrusions thereon or therein. The method can include transmitting an acoustic signal through the bottom, the plurality of recesses, grooves, or protrusions providing a plurality of times of flight of the acoustic signal through the bottom. The method also can include receiving a reflection of the transmitted acoustic signal; and characterizing an acoustic impedance of the container based on the reflection.

In some embodiments, the method includes retrieving from a computer-readable medium a value characterizing a thickness of the bottom based on the reflection. The characterizing the acoustic impedance of the container can be based on the retrieved value characterizing the thickness of the bottom.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase reflection of the acoustic signal. For example, in some embodiments, the plurality of recesses, grooves, or protrusions include a hydrophobic micropillar array.

In some embodiments, the plurality of recesses, grooves, or protrusions are located outside of an acoustic path between the fluid and an acoustic transducer generating the acoustic signal. In some embodiments, the plurality of recesses, grooves, or protrusions are located along and within an acoustic path between the fluid and an acoustic transducer generating the acoustic signal.

In some embodiments, the container includes a multiwell plate, and a vertical sidewall of the at least one vertical sidewall and the bottom correspond to a single well of the multiwall plate.

In some embodiments, the sidewall and the bottom include a plastic. In some embodiments, the plastic is selected from the group consisting of cyclic olefin polymer, cyclic olefin copolymer, polypropylene, and polystyrene.

Under another aspect, a method of characterizing a container configured to hold a fluid includes providing the container. The container can include at least one vertical sidewall; and a bottom coupled to the at least one vertical sidewall, the bottom being configured to receive an acoustic signal, the bottom including a thickness. The method can include receiving a reflection of the transmitted acoustic signal, the reflection having a time of flight through the thickness; identifying the container based on the time of flight; and characterizing an acoustic impedance of the container based on the identification.

Under still another aspect, a system for characterizing a container configured to hold a fluid includes the container. The container can include at least one vertical sidewall; and a bottom coupled to the at least one vertical sidewall, the bottom being configured to receive an acoustic signal, the bottom including a plurality of recesses, grooves, or protrusions thereon or therein. The system also can include an acoustic transducer configured so as to transmit an acoustic signal through the bottom, the plurality of recesses, grooves, or protrusions providing a plurality of times of flight of the acoustic signal through the bottom. The acoustic transducer further can be configured so as to receive a reflection of the transmitted acoustic signal. The system further can include a controller configured so as to characterize an acoustic impedance of the container based on the reflection.

In some embodiments, the system further includes a computer-readable medium. The controller can be configured so as to: retrieve from the computer-readable medium a value characterizing a thickness of the bottom based on the reflection; and characterize the acoustic impedance of the container based on the value characterizing the thickness of the bottom.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase reflection of the acoustic signal. For example, in some embodiments, the plurality of recesses, grooves, or protrusions include a hydrophobic micropillar array.

In some embodiments, the plurality of recesses, grooves, or protrusions are located outside of an acoustic path between the fluid and an acoustic transducer generating the acoustic signal. In some embodiments, the plurality of recesses, grooves, or protrusions are located along and within an acoustic path between the fluid and an acoustic transducer generating the acoustic signal.

In some embodiments, the container includes a multiwell plate, a vertical sidewall of the at least one vertical sidewall and the bottom corresponding to a single well of the multiwall plate.

In some embodiments, the sidewall and the bottom include a plastic. In some embodiments, the plastic can be selected from the group consisting of cyclic olefin polymer, cyclic olefin copolymer, polypropylene, and polystyrene.

Under yet another aspect, a system for characterizing a container configured to hold a fluid includes the container. The container can include at least one vertical sidewall; and a bottom coupled to the at least one vertical sidewall, the bottom being configured to receive an acoustic signal, the bottom including a thickness. The system can include an acoustic transducer configured so as to transmit an acoustic signal through the bottom. The acoustic transducer further can be configured so as to receive a reflection of the transmitted acoustic signal, the reflection having a time of flight through the thickness. The system further can include a controller configured so as to: identify the container based on the time of flight; and characterize an acoustic impedance of the container based on the identification.

DETAILED DESCRIPTION

This application relates to tagging containers, such as containers formed using injection molding. But it will be appreciated that the invention has a much broader range of applicability.

For example, an injection mold can include multiple cavities to make the "same" part as one another. However, one concern regarding such a multi-cavity approach as it relates to acoustic liquid handling is that variations in the acoustic properties can exist from one container or cavity as compared to another container or cavity (or even within one cavity or container), which can affect the acoustic characterization of that container, a liquid within that container, and acoustic transfer of that liquid from that container. In such cases, an assumption may not be valid that each part made from the mold, whether it is one cavity or multi-cavity, has similar part molding and solidification dynamics such that they can be assumed to be the same and thus are acoustically indistinguishable from each other. Once the assumptions of the acoustic properties of the container, e.g., acoustic impedance, are no longer valid, the determination of the acoustic properties of the fluid therein, e.g., acoustic impedance of that fluid, can become difficult or impossible using previously available techniques, such as schematically illustrated in FIG. 1.

Figure 1:
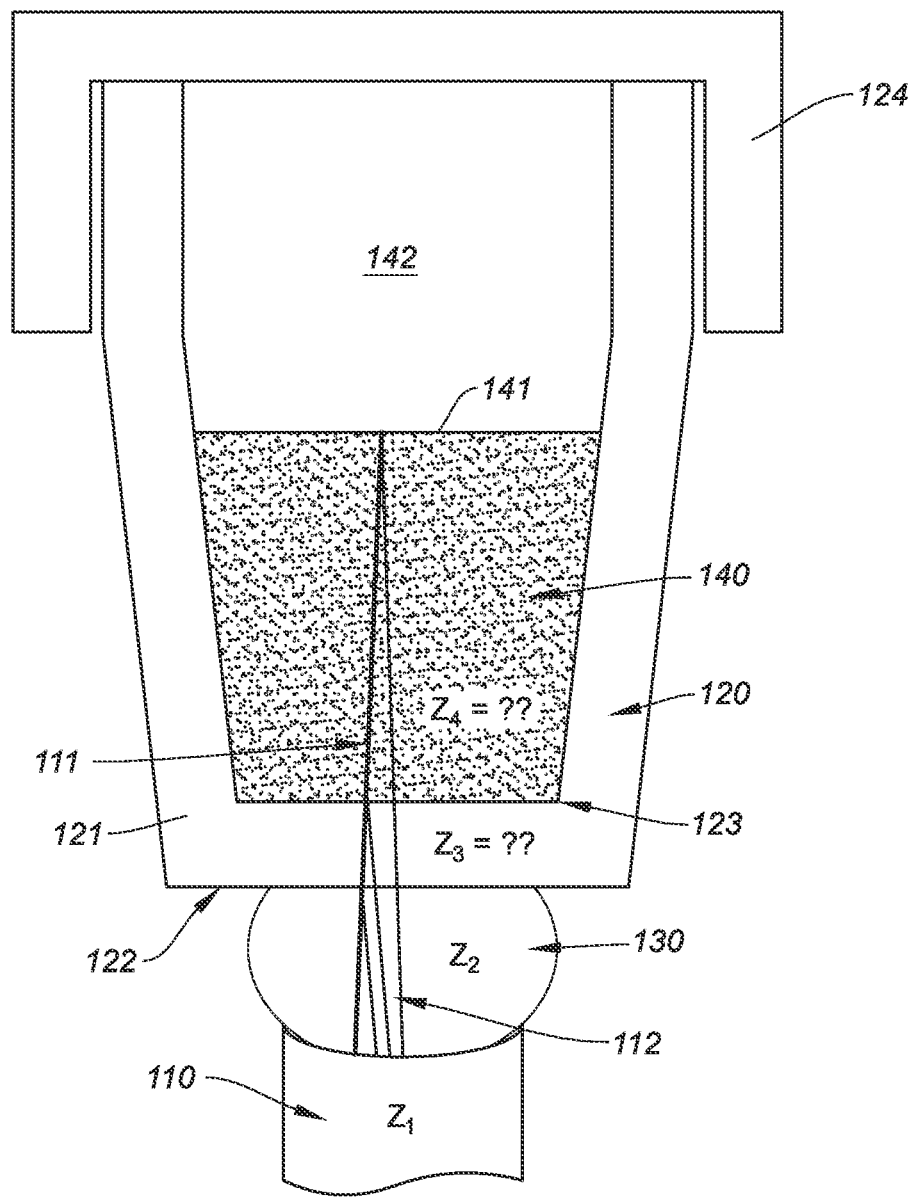
FIG. 1 schematically illustrates an arrangement including a container and a fluid therein coupled to an acoustic transducer with predetermined properties and in which the acoustic impedance of the fluid and the container bottom are unknown.

For example, FIG. 1 schematically illustrates an exemplary arrangement for characterizing a container and a fluid therein. In FIG. 1, an acoustic transducer assembly 110 is coupled to the bottom of a container 120 (e.g., a plastic container, such as a tube) via a coupling fluid 130, and a fluid 140 is disposed within the container 140. An acoustic signal 111 is initiated from the transducer 110 and focused through the various intermediate materials to a spot at or near the fluid surface 141. At each of the interfaces, e.g., between the coupling fluid 130 and the bottom 122 of the container bottom 121 (BB), between the top 123 of the container bottom 121 (TB) and the fluid 140, and between the top 141 of the fluid 140 and the air 142, parts 112 of the acoustic signal are reflected back to the transducer 110 and converted back into digital information. The voltage that the acoustic signal 112 induces in the transducer 110, the frequency content of the acoustic signal 112, and the time after the initial acoustic signal 112 are recorded and subsequently analyzed. However, analysis of the acoustic impedance of the fluid 140 ($Z_4$) cannot be determined accurately without sufficient knowledge of the acoustic impedance of the bottom 121 of the container ($Z_3$). The acoustic impedance of the transducer assembly 110 ($Z_1$) and of the coupling fluid 130 ($Z_2$) are both known. When the reliable measurement of the acoustic impedance of the fluid 140 is not possible, proper selection of the acoustic ejection parameters for transferring the liquid 140—such as the focal point, frequency of the acoustic signal 111, voltage delivered to the transducer 110, and the like—cannot be properly selected from a lookup table or database.

Therefore, it is desirable to have an ability to identify and track from where parts (such as containers), or features within a single part (e.g., container), originated within a mold (e.g., an injection mold for plastic) so as to facilitate monitoring and managing deviations in molding dynamics. For example, the ability to track the molding location can facilitate establishment of the typical (e.g., average) acoustic impedance of parts coming from that location or mold, preserving the ability to make assumptions about the plastic and enabling the subsequent identification of customer fluids properties. It is desirable that this information should also be accessible and amenable to rapid, unambiguous acoustic characterization during routine operation.

The systems and methods presented in this document are described in the context of an acoustic container that in some ways is similar to that illustrated in FIG. 1, as this is a particularly useful example where the systems and methods can be used to properly audit the fluid and perform acoustic droplet ejection. However, the present systems and methods are broadly applicable to parts having other form factors, e.g., such as suitable for use in acoustic liquid handling, such as multi-well plates or microfluidic consumable devices. In some embodiments, the present containers can be fabricated from a multi-cavity mold, and randomly delivered to a liquid handler similar to that illustrated in FIG. 1. Therefore, so as to facilitate determining the acoustic properties of the container or part molded in each cavity, it is useful to provide mold tracking features on or within each container or part so the acoustic properties for parts from each cavity of the mold can be known based on a previously measured or predetermined value. Such tracking features can, in some embodiments, include geometric features that are tooled into the mold itself so as to include specific tagging features within all parts generated by that cavity without the need for further modification after being ejected from the mold. Alternatively, post-molding modifications can be made to all parts from a cavity of the mold so as to enhance the ability to detect the molded-in tagging features. Other exemplary embodiments can include distinct post-molding modifications of parts made from different cavities such that the parts can be modified based on their cavity of origin to produce the appropriate tag. Non-limiting examples of post-molding features include: a super-hydrophobic coating that is selectively patterned on the surface of the part that changes the reflected acoustic signals; laser bar codes that selectively change the polymer structure to change the reflected acoustic signals; etched or protruding microstructures fabricated in a convenient location on the part; overmolding of various materials that reflect varying amounts of acoustic signal; 3D printing of patterns; and the like—with each pattern uniquely corresponding to the mold location.

For example, some embodiments of the present systems and methods can use unique tags (which also can be referred to as patterns or identifiers) that are introduced into the mold to identify from where the part (e.g., if utilizing a multiple cavity mold for producing nominally identical parts), or features within a part (e.g., one well in a multi-well plate, for example) originated within the mold. The tag can include a variety of suitable features, e.g., one or more of the following four features, and optionally a combination of each of the following four features:

1) the features of the tag substantially do not disrupt the acoustic characterization or droplet ejection (transfer) process;

2) the features of the tag uniquely identify the location of the mold where the part or feature was fabricated;

3) the features of the tag can be read using acoustic signals from a transducer and subsequently interpreted (e.g., the same transducer, but not limited to the same transducer); and/or 4) the features of the tag are not detrimental to the normal operation of the liquid handler.

Figure 2:
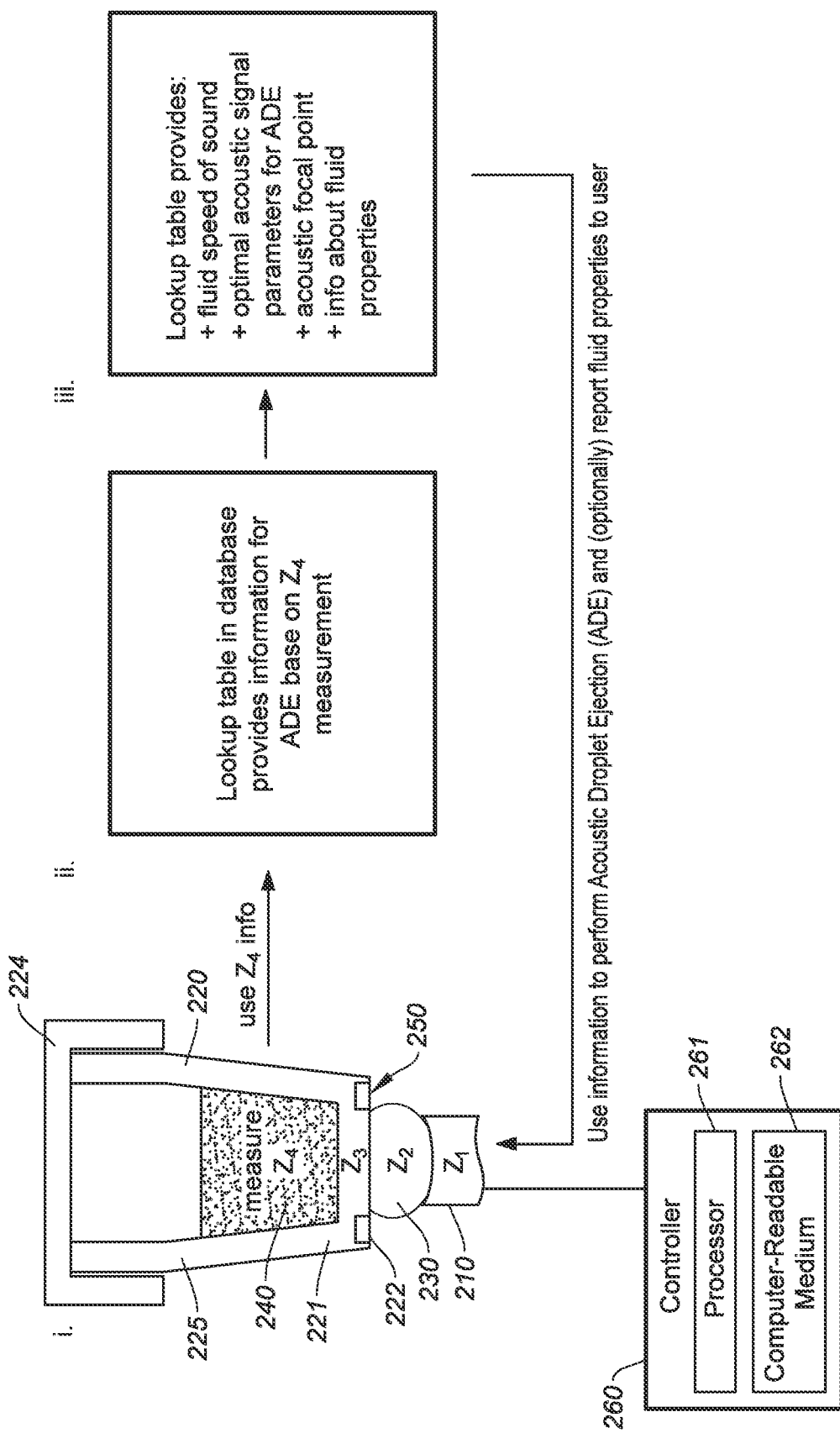
FIG. 2 schematically illustrates exemplary steps for acoustically characterizing a tagged container and a fluid therein, according to some embodiments of the present invention.

For example, FIG. 2 schematically illustrates exemplary steps for acoustically characterizing a tagged container 220 and a fluid 240 therein, according to some embodiments of the present invention. With the introduction of mold identification features on each part, e.g., container 220, calibration curves can be prepared that characterize the acoustic impedance (or potentially another acoustic property such as sound speed) of each part, and assumptions can be made regarding the acoustic characteristics of the material from which the part is made. Such information can be used in a lookup table that was previously developed using the liquid handler, and the correct acoustic droplet ejection parameters can be selected so as to achieve the desired droplet volume of the fluid. The acoustic impedance of the fluid 240 can be particularly useful as it can also can be used to report certain characteristics of the fluid, such as the concentration of certain compounds, e.g., the percentage of dimethyl sulfoxide, glycerol, or the like. For example, as illustrated in FIG. 2, the container 220 can be characterized using the tag 250 embedded therein (mold/cavity identifier), and acoustic impedance of the fluid 240 ($Z_4$) can be measured (step i), e.g., including generating an acoustic signal with transducer 210, transmitting that signal to container 220 and fluid 240 via coupling fluid 230, and receiving acoustic reflections at transducer 210 via coupling fluid 230. Tag 250 can have any suitable configuration, including but not limited to any configuration described herein with reference to Exemplary Embodiments 1, 2, 3, 4, 5, 6, or 7, or suitable modification thereof. Information about $Z_4$ then can be used with a lookup table in a database that provides information for acoustic droplet ejection (ADE) based on the $Z_4$ measurement (step ii). The lookup table can provide one or more of the following information, and optionally a combination of all of the following information (step iii): fluid speed of sound, optimal acoustic signal parameters for ADE, acoustic focal point, and information about fluid properties. Any of such information suitably can be used to perform ADE and optionally to report fluid properties to a user, e.g., via a display coupled to the liquid handler.

For example, in one non-limiting embodiment, the present system can include the container (e.g., container 220), which includes at least one sidewall (e.g., sidewall 225) and a bottom (e.g., bottom 221), and a plurality of recesses, grooves, or protrusions (e.g., tag 250) included on or within the bottom. The system also can include an acoustic transducer (e.g., transducer 210) configured so as to transmit an acoustic signal through the bottom, the plurality of recesses, grooves, or protrusions providing a plurality of times of flight and voltages of the acoustic signal through the bottom. The acoustic transducer further can be configured so as to receive a reflection of the transmitted acoustic signal. The system also can include a controller 260, such as a computer and associated software algorithms, configured so as to characterize an acoustic impedance of the container based on the reflection, e.g., such as a computer including a processor 261 and a non-volatile computer readable medium 262, and associated software algorithms stored on the computer readable medium, configured so as to cause the processor to characterize an acoustic impedance of the container based on the reflection.

Note that in embodiments such as illustrated in FIG. 2 and elsewhere herein, any suitable portion of sidewall 225 can have any suitable angle relative to bottom 221 so as to be considered "vertical." For example, some or all of sidewall 225 can be considered to be "vertical" at a range of angles between about 10 degrees and 90 degrees relative to bottom 221. Additionally, different portions of sidewall 225 can have different angles than one another relative to bottom 221. For example, in the nonlimiting embodiment illustrated in FIG. 2, a first (e.g., lower) portion of sidewall 225 can have a first angle relative to bottom 221, and a second (e.g., upper) portion of sidewall 225 can have a second angle relative to bottom 221. Illustratively, the first angle can be smaller than the second angle, or the first angle can be larger than the second angle. In one example, sidewall 225 can be arranged such that one or both of the outer surface and the inner surface of container 220 is generally conical. Such a configuration can, for example, reduce dead volume within container 220 or facilitate liquid 240 to collect more easily at the bottom of container 220 with a greater depth.

In another example, a method of characterizing a container (e.g., container 220) configured to hold a fluid (e.g., fluid 240) can include providing such a container; transmitting an acoustic signal through the bottom (e.g., bottom 221), the plurality of recesses, grooves, or protrusions (e.g., tag 250) providing a plurality of times of flight of the acoustic signal through the bottom; receiving a reflection of the transmitted acoustic signal; and characterizing an acoustic impedance of the container based on the reflection.

In some embodiments, the present tags (e.g., tag 250) can be implemented using any suitable combination of a variety of design considerations, such as one or more of: managing the coupling fluid-plastic interaction by avoiding features that can get stuck on the part (e.g. sharp corners that would retain fluid and be difficult to remove with suction or a vacuum dryer); disposing the features of the tag outside of the path of the acoustic signal during fluid characterization and ejection (transfer) steps; and/or utilizing tag features that are dimensionally compatible with the dimensions of the part and can be resolved by the acoustic signal, e.g., with a wavelength generated by the same transducer that is used to transfer as well as the transducer used for other acoustic transfer applications. For example, some transducers can have characteristic wavelengths on the order of 250 µm and 125 µm, for the transfer of 25 and 2.5 nL droplets, respectively. Acoustic signals generally are understood to be able to resolve features whose lateral dimensions are approximately no smaller than half the wavelength of the acoustic signal; so in this non-limiting example, one or more features of the tag include a dimension that is at least about 125 µm for a 25 nL instrument, or at least about 63 µm for a 2.5 nL instruments. In some embodiments, features of the tag are sufficiently spaced apart from one another such that they can be easily molded and resolved by an acoustic transducer, e.g., the same transducer used for acoustic droplet ejection could also be used to detect these features. Such design considerations can extend to shorter and longer wavelength transducers and can be expected to scale in a linear fashion. In some embodiments, the sensitivity of measurement based on the time of flight to the features of the tag can be finer than the half wavelength based upon the sampling frequency of the measurement device connected to the acoustic receiver substantially exceeding the frequency of the acoustic wave. For example, sampling 10 MHz acoustic signals reflected from half-wavelength features with 300 MHz or higher analog-to-digital resolution with a water coupling fluid between the transducer and container feature can provide 10 micron or less accuracy of the feature distance from the transducer. Raising acoustic frequency and time resolution of signal detection can improve feature detection as well as other techniques known to those of skill in the art of sonar and medical ultrasound.

Furthermore, the position of the transducer for focusing the acoustic wave can impact the measurement time and resolving capability of the transducer. For example, certain fluid characterization applications can be performed without the transducer focused at the bottom of the fluid container, which in some circumstances can result in lower resolution. In another example, the transducer can be lowered so as to focus the acoustic signal closer to the mold identification feature, so as to improve the ability to resolve small features. This refocusing movement can require tens or hundreds of milliseconds depending on the motion system and distance from audit position to feature detection position. In some embodiments, the features of the tag can be observed acoustically with no additional time required to perform the measurement, in contrast to other methods such as a secondary transducer, camera, or laser system that can require hundreds of milliseconds or more per measurement.

Additionally, the acoustic transducer can be configured so as to operate with standard container materials and fluids that are commonly utilized for acoustic liquid handling in the life sciences. Exemplary plastics that suitably can be included in the present containers include, but are not limited to, a plastic selected from the group consisting of: cyclic olefin polymer, cyclic olefin copolymer, polypropylene, and polystyrene. For example, a commonly used polymer such as polypropylene has an acoustic impedance value on the order of 2.5 MRayl; and fluids most commonly transferred in life sciences applications range from 0.8 to 2.4 MRayl. The variation in the acoustic impedance of a polymer, such as polypropylene, can vary in tenths of MRayl due to acoustic molding processes. Therefore, the acoustic transducer can be configured so as to resolve differences in acoustic impedance between these materials on this scale, using acoustic signal processing such as known to those of skill in the art. Note that this example does not limit the present systems and methods to acoustic impedance of polypropylene, or the acoustic impedance of fluids described herein.

Such exemplary design considerations, and other design considerations, can be used in some embodiments of the present systems and methods. For example, practitioners of injection molding would understand the need for draft angles to facilitate mold release for various plastics.

Various non-limiting embodiments, and various examples of design considerations that suitably can be implemented in such embodiments, now will be described.

In some embodiments, tags are provided for a tube and rack scheme, where tubes are filled with customer fluids and placed within a rack (containing spaces for 96 tubes, in one non-limiting example). In such embodiments, the tags (patterns) can be arranged so as to be conveniently readable by the acoustic beam, e.g., by not requiring alignment along a particular axis (one example described below with reference to exemplary embodiment 4), or by including alignment features at the tube-rack interface. For example, in some embodiments, the tags (unique identifying patterns) can be replicated at two or more predetermined positions. One non-limiting embodiment can include tags disposed at the "3, 6, 9, and 12 o'clock" positions along the tube perimeter (e.g., four-fold rotational, and x- and y-axis mirror symmetry), optionally with corresponding grooves in the rack so as to facilitate proper placement. Such an arrangement can facilitate scanning a rack of tubes either horizontally or vertically and putting the tags (patterns) within the scan range of the acoustic beam. One non-limiting example of such an embodiment includes four notches, but it should be recognized that the tags can be replicated n times along the perimeter and m notches, where n and m can be different integer values, can be provided so as to facilitate proper alignment of the tags. If the number of pattern replicates became high enough (high n), notches or alignment patterns may not necessarily be needed (e.g., complete rotational symmetry can be preserved).

The following descriptions assume proper alignment of the features, and detail various non-limiting patterning and readout techniques that can be used so as to achieve the desired function of identifying the original mold location (or mold if more than one used to make the same parts) for the part using acoustic signals.

Exemplary Embodiment 1: Dimples Representing 0/1's that are Read Acoustically

Figure 3:
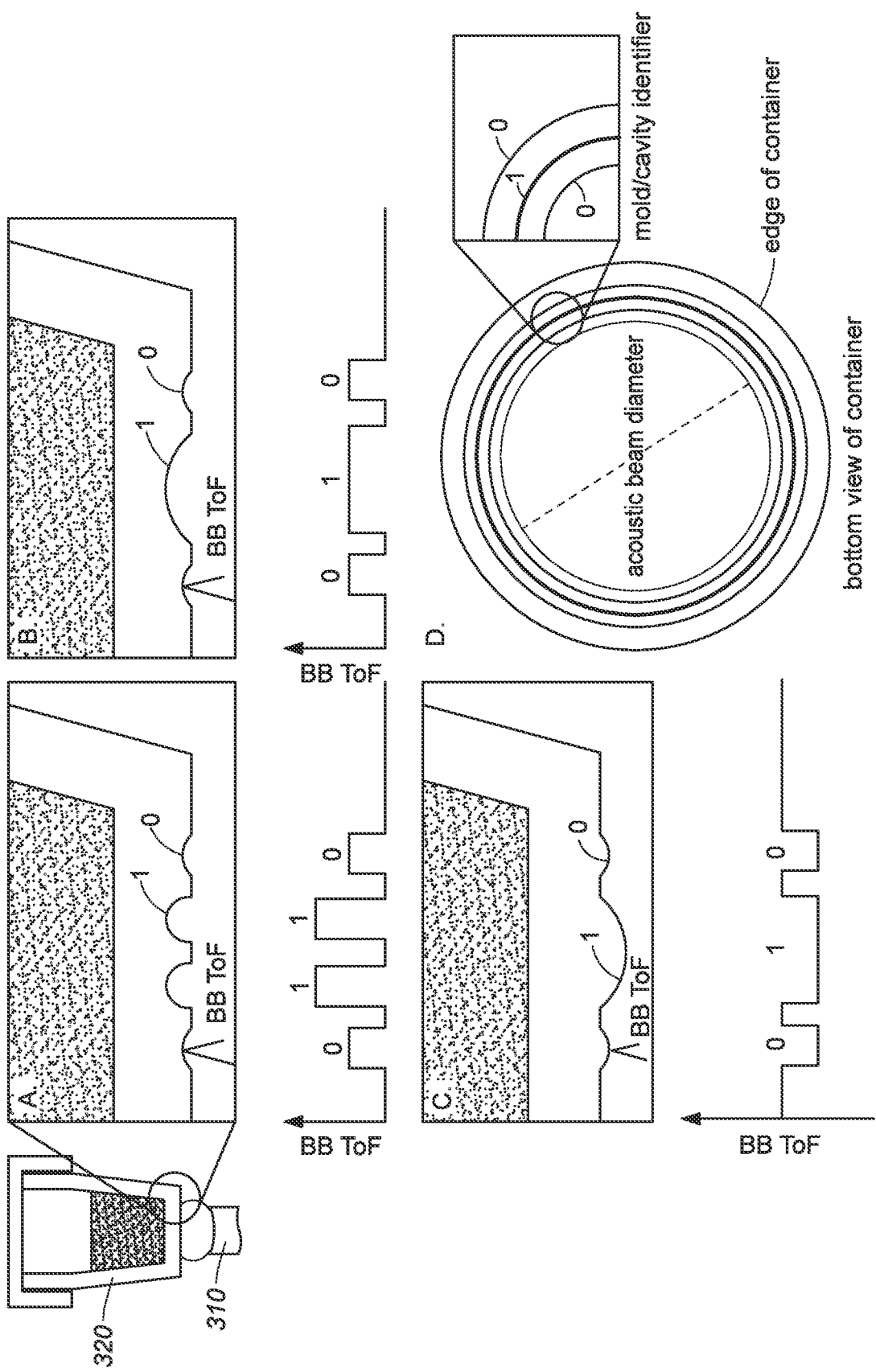
FIG. 3 schematically illustrates exemplary features that can be provided in a container so as to tag that container and acoustically characterize the container, according to some embodiments of the present invention.

One non-limiting approach to encoding information (a tag) uses binary information so as to encode the location of the feature (e.g., well) or part (e.g., cavity # within the mold. For example, FIG. 3 schematically illustrates exemplary features that can be provided in a container 320 so as to tag that container and acoustically characterize the container in a manner such as described herein with reference to FIG. 2, according to some embodiments of the present invention. More specifically, FIG. 3 illustrates an exemplary embodiment for patterning digital information in a container 320, outside the acoustic path of ADE. The zoomed-in insets of FIG. 3 (A-D) illustrate examples of how digital features of a tag can be patterned along the periphery of an acoustic container 320, or near a well in a multi-well plate 320 (side view of the container in A-C; bottom view in D). The graphs below the respective insets show an idealized interpretation of the returning acoustic time-of-flight (ToF) signal. In some embodiments, the features of the tag suitably can accommodate one or more ADE design constraints, such as reducing or avoiding sharp corners to reduce or inhibit fluid pinning, or can be of appropriate size so as to maintain coupling of the fluid and the container while allowing for drying operations. In some embodiments, the pattern can be one-dimensional (1-D), e.g., as shown in FIG. 3, so as to be read during translation from one tube to the next along a line. In other embodiments, the pattern can be two-dimensional (2-D), where the second dimension is along the transducer's major axis, or along the axis perpendicular to the translational axis shown in FIG. 3 (e.g., in and out of the page). Inset A in FIG. 3 illustrates an exemplary embodiment in which bits can be coded along the transducer 310 major axis. Inset B in FIG. 3 illustrates an embodiment in which bits can be encoded by varying one of the x-y translational axis. Note that other suitable combinations of such features readily can be envisioned, such as providing unique aspect ratios along the translational axis. Additionally, although insets A and B of FIG. 3 show recessed features of the tag, the features instead suitably can protrude from the bottom of the part 320 or can be recessed within the part 320; or some combination of the two conditions or configurations. For example, inset C illustrates an embodiment in which bits are encoded with raised features, rather than recessed features.

The acoustic signal obtained from parts 320 such as illustrated in FIG. 3 can include the ToF of the acoustic signal from the bottom-bottom (BB) of the part 320 (e.g., bottom 222 of bottom 221 (BB) of tube or container 220 such as described herein with reference to FIG. 2)—e.g., the total time from when the acoustic signal initially was launched to when the reflected acoustic signal returns to the transducer 310. Two different ToF values can be received by the transducer 310, with one ToF representing "1" (corresponding to the deeper recesses in the tag) and another ToF value representing a "0" (corresponding to the shallower recesses in the tag). The pattern of "bits" can be 1-D, which can provide information relatively quickly and can be rotationally redundant without the need for alignment; or can be 2-D, e.g., so as to implement x-y grid surveys, which potentially can provide greater information density but potentially can be slower to execute. A liquid handler can reliably resolve small changes in the ToF detected by the transducer 310. For example, features that vary by tens of microns in depth from one another can produce ToFs that can be distinguished reliably by a liquid handler using either 5 to 10 MHz for the acoustic detection pulse. Greater sensitivity can be achieved by using higher sound frequencies and optimizing focus on the features to be measured. In some embodiments, the returning acoustic signals can include absolute values, such as unique ToFs for 0's and 1's, or can be related to another acoustic signal on the part, such as the ToF in the non-patterned portion of the part or within the patterns themselves.

One non-limiting example of this embodiment includes 64 unique patterns on or within the container-bottom and arranged in a bit-wise patterning scheme including 6 unique bits that respectively correspond either to 1 or 0. In this example, each bit can be discernible as a 1 or 0 by the acoustic transducer. Note that other suitable combinations of such features readily can be envisioned, such as providing unique aspect ratios along the translational axis so that each feature provided more than one bit of information. Such embodiments are broadly extendible to a variety of geometric patterns and dimensions and can be optimized by one of skill in the art based on the teachings provided herein.

Exemplary Embodiment 2: Dimples that Change in Length, Aspect Ratio, or Depth

In another non-limiting embodiment of the invention, the present tags can convey still further information by utilizing 3-D patterning, e.g., in which length, aspect ratio, depth, frequency, or any other geometric feature of the pattern suitably can be selected so as to uniquely encode information from the mold location onto the part. Such embodiments can be higher-resolution than certain 1-D or 2-D embodiments because the features can be considered to be more "analog" in nature rather than being converted to 1's and 0's.

Figure 4:
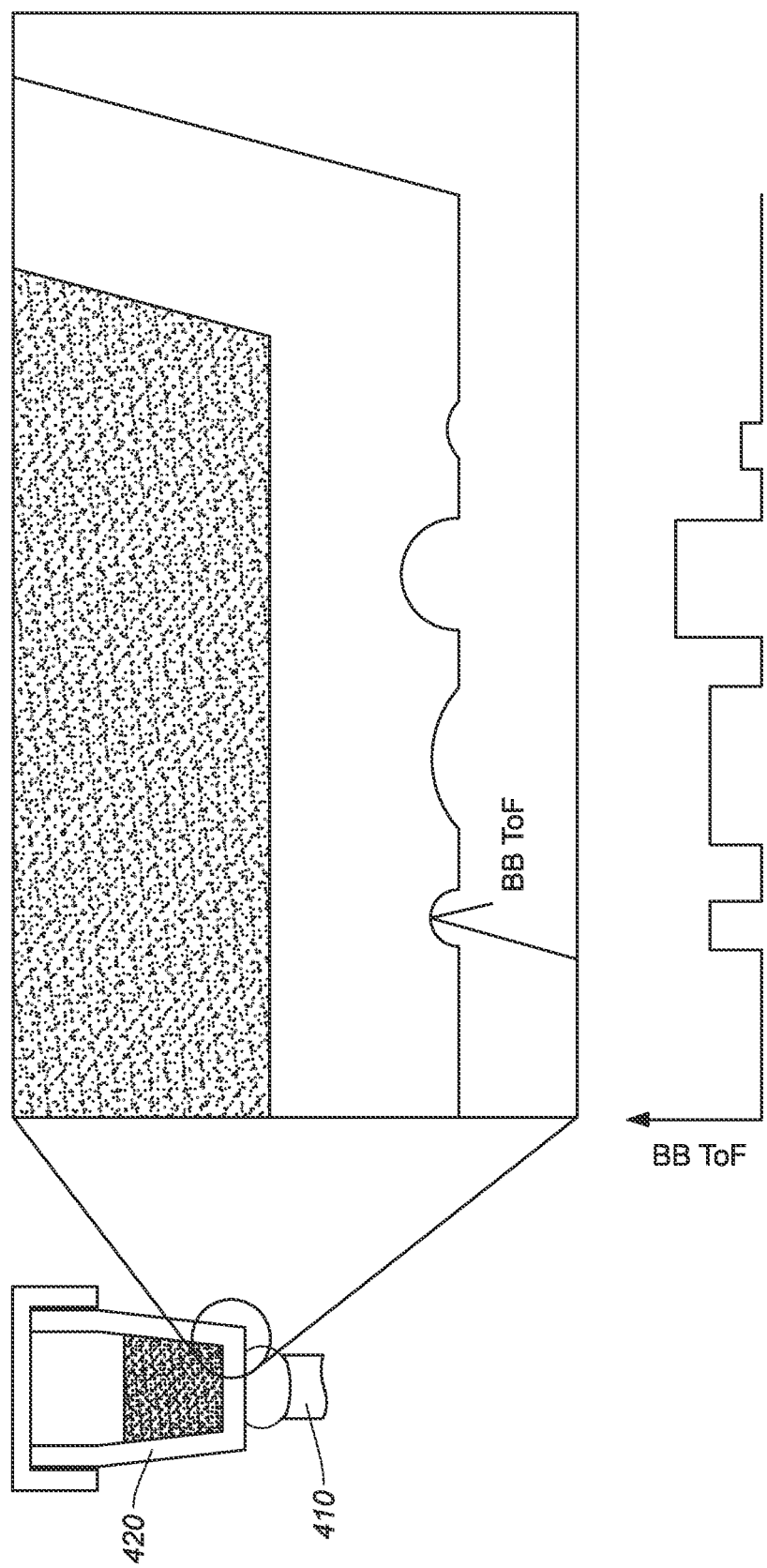
FIG. 4 schematically illustrates exemplary features that can be provided in a container so as to tag that container and acoustically characterize the container, according to some embodiments of the present invention.

For example, FIG. 4 schematically illustrates exemplary features that can be provided in a container 420 so as to tag that container and acoustically characterize the container in a manner such as described herein with reference to FIG. 2, according to some embodiments of the present invention. The graph below the features show an idealized interpretation of the returning acoustic ToF signal. More specifically, FIG. 4 illustrates a non-limiting embodiment of a pattern of unique shapes and geometries outside the acoustic path of ADE in a more "analog" type format, in which the magnitude and shape of the features to be read are tied to the respective location within the mold. All three dimensions, the two x- and y-translational axes and the transducer 410 z-axis, can be used for encoding information (e.g., in the form of features of a tag). Notice that the BB ToF varies in magnitude (height of each peak in the graph), and duration as the transducer scans the features (width of each peak). One exemplary feature of such a scheme is that more complex information can be stored within a given amount of space.

In one example, based upon the acoustic system being capable of resolving depth differentials of features at 10 micron resolution and four possible feature depths being used with each 20 microns deeper than the next, then 2 bits can be encoded with features in which the largest and smallest feature depths differ from one another by 60 microns. Larger depth ranges or finer step sizes suitably can be used based on the container dimensions, acoustic frequencies, container material(s), and the like.

Exemplary Embodiment 3: Superhydrophobic Design Features that Introduce an Air Gap In another non-limiting embodiment, an alternative readout method to the BB ToF is to utilize the voltage returned from the BB acoustic reflection (BB peak-to-peak voltage, or BB Vpp). The pattern imparted on the part (e.g., container) can include one or more superhydrophobic features, such as a micropillar array, that intentionally introduce one or more air gaps at the coupling fluid-plastic interface so as to return a higher acoustic signal voltage than regions where sound is more uniformly transmitted through the plastic (e.g., no air gap between the coupling fluid and the plastic). Such air gaps can be patterned in a digital, 1's and 0's, format in a manner similar to that described above with reference to exemplary embodiment 1; or such air gaps can be patterned in 1-D or 2-D analog formats in a manner similar to that described above with reference to exemplary embodiment 2; the third depth dimension optionally can be used, for example, in embodiments in which BB ToF is simultaneously considered, or BB Vpp is adequately resolved as a function of distance along the depth dimension. Exemplary features of such embodiments can include one or more of: increased sensitivity in acoustically reading the BB Vpp, and to relatively straightforward management strategies of the coupling fluid-plastic interaction.

Figure 5:
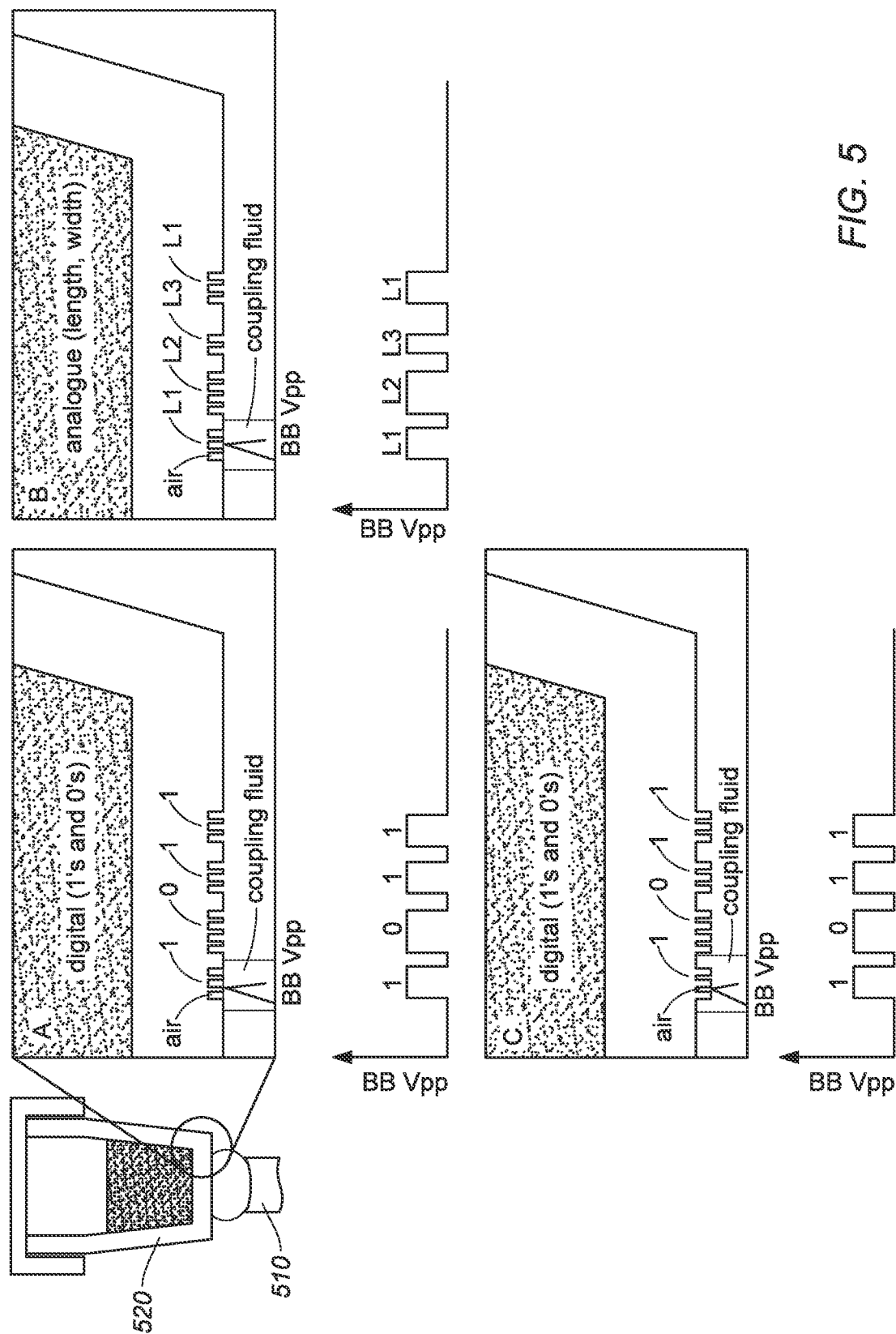
FIG. 5 schematically illustrates exemplary features that can be provided in a container so as to tag that container and acoustically characterize the container, according to some embodiments of the present invention.

For example, FIG. 5 schematically illustrates exemplary features that can be provided in a container 520 so as to tag that container and acoustically characterize the container in a manner such as described herein with reference to FIG. 2, according to some embodiments of the present invention. More specifically, FIG. 5 illustrates non-limiting examples of embodiments in which a tag includes hydrophobic features provided outside the acoustic path of ADE, e.g., in which air-containing breaks between the coupling fluid and plastic of the part (e.g., container) are introduced so as to increase reflection of the acoustic signal to the transducer 510. In some embodiments, such breaks can be provided by patterning hydrophobic features, such as a micropillar array, into the plastic of the container. The graphs below the insets show the voltage increasing at the fluid-air interface, which can be read instead of the ToF. Inset A illustrated in FIG. 5 shows an exemplary embodiment that includes recessed notches that intentional decouple the coupling fluid from the plastic. Inset B illustrated in FIG. 5 shows an exemplary embodiment that includes an "analog" type encoding scheme using similar features. Inset C illustrated in FIG. 5 shows an exemplary embodiment that includes digital patterning using raised hydrophobic features. Note that although the non-limiting embodiments of in insets A-C are illustrated as including relatively sharp edges, such edges instead can be curved and otherwise suitably shaped so as to reduce or inhibit fluid pinning.

Exemplary Embodiment 4: Variations in Thickness of the Plastic in the Path of Acoustic Beam In another embodiment, the tag (e.g., feature that identifies a mold location) can be located at the interface between the container and the fluid disposed therein, or the top of the bottom (TB) of the part. For example, the difference in ToF between the TB and BB acoustic signals (divided by two), represents the total time the acoustic signal takes to move through the part or container bottom, e.g., plastic, one-way. Such a difference in ToF (divided by two) can be converted to a membrane thickness—the thickness of the bottom of part (e.g., acoustic tube) that is an intermediary between the coupling fluid and the fluid within the container. The membrane thickness of the part suitably can be varied so as to resolve the membrane thickness differences that are intentionally introduced in parts from different locations within the mold. Alternatively, just the BB ToF (BB distance to the transducer) can also be varied so as to change the membrane thickness of the part. In some embodiments, only a single acoustic signal can be used so as to obtain such a difference in ToF, although more than one acoustic signal suitably can be used. Note that the membrane optionally can be in the acoustic path of ADE.

Figure 6:
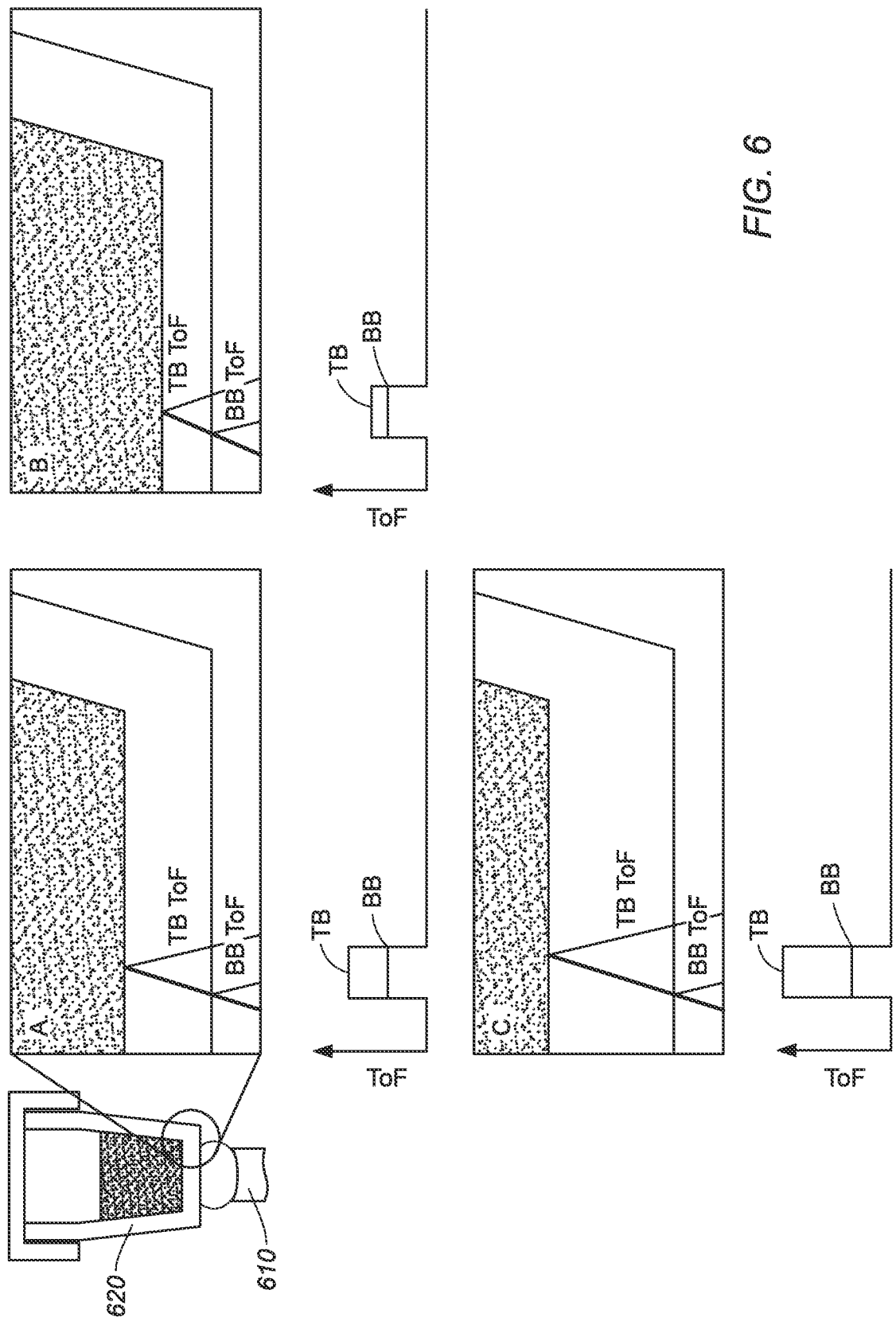
FIG. 6 schematically illustrates exemplary features that can be provided in a container so as to tag that container and acoustically characterize the container, according to some embodiments of the present invention.

For example, FIG. 6 schematically illustrates exemplary features that can be provided in a container 620 so as to tag that container and acoustically characterize the container in a manner such as described herein with reference to FIG. 2, according to some embodiments of the present invention. More specifically, FIG. 6 illustrates an embodiment that includes patterning variable membrane thicknesses (optionally) within the acoustic path of ADE, and in which the membrane thickness, e.g., the differential distance of BB and TB from the transducer 610, can be varied between parts so as to identify the well's location within the mold. For example, a unique membrane thickness can be assigned to each part within the mold/cavity such that the parts are acoustically distinguishable from one another. The graphs below the respective insets show an idealized interpretation of the returning acoustic time-of-flight ToF signal. Inset A illustrated in FIG. 6 shows one exemplary embodiment in which the TB ToF is varied. Inset B illustrated in FIG. 6 shows another exemplary embodiment in which the BB ToF is varied. Inset C illustrated in FIG. 6 shows another exemplary embodiment in which the TB ToF is made taller (thicker) such that the acoustic signal recognition used to characterize the fluid and perform ADE still functions properly.

Figure 7:
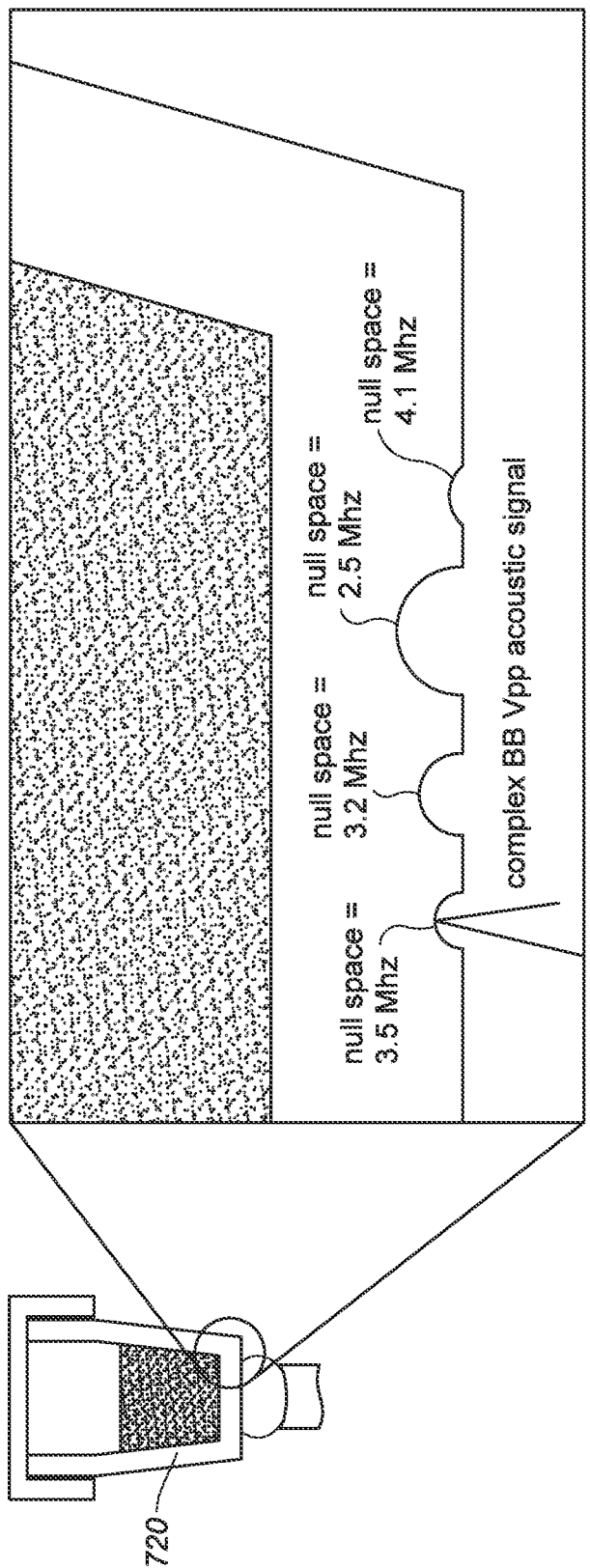
FIG. 7 schematically illustrates exemplary features that can be provided in a container so as to tag that container and acoustically characterize the container, according to some embodiments of the present invention.

Exemplary Embodiment 5: Exemplary Features that Utilize Mound Imaging Algorithms with One or More Null Space Solutions In another non-limiting embodiment, an alternative readout method can be used that examines the returning complex frequency content of an acoustic signal interacting with a uniquely shaped dimple in the plastic. For example, FIG. 7 schematically illustrates exemplary features that can be provided in a container 720 so as to tag that container and acoustically characterize the container in a manner such as described herein with reference to FIG. 2, according to some embodiments of the present invention. More specifically, FIG. 7 illustrates that acoustic characteristics of a fluid can be determined by examining the complex frequency content of the returning acoustic signal after a "mound" has been formed on the fluid surface. The shape of the mound can create unique acoustic signals that can be interpreted so as to identify the "null spacing" of the signals (targeted minima in the Fourier-space of the acoustic signal). In some embodiments, dimples of particular diameter (or ellipsoidal), depth, and shape can be indented outside of the acoustic ejection window so as to create null space identifiers that are unique to the location of the mold. Such embodiments can represent a more analog method of conveying the information, which has the advantage of needing fewer features on the part.

For example, in one non-limiting embodiment, a system for characterizing a container configured to hold a fluid can include the container, the container including at least one vertical sidewall; and a bottom coupled to the at least one vertical sidewall, the bottom being configured to receive an acoustic signal, the bottom including a thickness that varies along a lateral dimension. The system also can include an acoustic transducer configured so as to transmit an acoustic signal through the bottom, the varying thickness providing a plurality of times of flight of the acoustic signal through the bottom. The acoustic transducer further can be configured so as to receive a reflection of the transmitted acoustic signal. The system further can include a controller, such as a computer and associated software algorithms, configured so as to characterize an acoustic impedance of the container based on the reflection.

In another non-limiting embodiment, a method of characterizing a container configured to hold a fluid, can include providing such a container; transmitting an acoustic signal through the bottom, the varying thickness providing a plurality of times of flight of the acoustic signal through the bottom; receiving a reflection of the transmitted acoustic signal; and characterizing an acoustic impedance of the container based on the reflection.

Exemplary Embodiment 6: Exemplary Features that Utilize Overmolding of Multiple Materials to Vary the Acoustic Impedance In another non-limiting embodiment, an alternative encoding method can be utilized, whereby the identifying features are distinguished from the primary container by overmolding one or more additional materials (non-limiting examples include polymers, metals, and ceramics), with acoustically distinguishable impedance value(s) compared to that of the container, to the pattern mold- or cavity-specific identifiers. In such embodiments, the distinguishing features can exhibit different BB voltage values (similar to embodiment 3), which can facilitate the pattern to be resolved acoustically by the transducer.

Exemplary Embodiments

In one non-limiting example, a container configured to hold a fluid includes at least one vertical sidewall; and a bottom coupled to the at least one vertical sidewall, the bottom being configured to receive an acoustic signal, the bottom including a plurality of recesses, grooves, or protrusions thereon or therein so as to provide a plurality of times of flight of the acoustic signal through the bottom. Examples of such containers are provided herein, e.g., with reference to FIGS. 2, 3, 4, 5, and 7.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase or decrease the amplitude of reflection of the acoustic signal. For example, in some embodiments, the plurality of recesses, grooves, or protrusions include a hydrophobic micropillar array.

In some embodiments, the plurality of recesses, grooves, or protrusions are configured so as to be located outside of an acoustic path between the fluid and an acoustic transducer generating the acoustic signal. In some embodiments, the plurality of recesses, grooves, or protrusions are configured so as to be located along and within an acoustic path between the fluid and an acoustic transducer generating the acoustic signal.

In some embodiments, the container includes a multiwell plate, a vertical sidewall of the at least one vertical sidewall and the bottom corresponding to a single well of the multiwall plate.

In some embodiments, the sidewall and the bottom include a plastic. In some embodiments, the plastic is selected from the group consisting of cyclic olefin polymer, cyclic olefin copolymer, polypropylene, and polystyrene.

Under another aspect, a container configured to hold a fluid includes at least one vertical sidewall; and a bottom coupled to the at least one vertical sidewall, the bottom being configured to receive an acoustic signal, the bottom including a thickness selected such that the container is identifiable based on a time of flight of the acoustic signal through the bottom. Examples of such containers are provided herein, e.g., with reference to FIG. 6.

Under yet another aspect, a method of characterizing a container configured to hold a fluid includes providing the container. The container can include at least one vertical sidewall; and a bottom coupled to the at least one vertical sidewall, the bottom being configured to receive an acoustic signal, the bottom including a plurality of recesses, grooves, or protrusions thereon or therein. The method can include transmitting an acoustic signal through the bottom, the plurality of recesses, grooves, or protrusions providing a plurality of times of flight of the acoustic signal through the bottom. The method also can include receiving a reflection of the transmitted acoustic signal; and characterizing an acoustic impedance of the container based on the reflection. Examples of such a method are provided herein, e.g., with reference to FIGS. 2, 3, 4, 5, and 7.

In some embodiments, the method includes retrieving from a computer-readable medium a value characterizing a thickness of the bottom based on the reflection. The characterizing the acoustic impedance of the container can be based on the retrieved value characterizing the thickness of the bottom.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase reflection of the acoustic signal. For example, in some embodiments, the plurality of recesses, grooves, or protrusions include a hydrophobic micropillar array.

In some embodiments, the plurality of recesses, grooves, or protrusions are located outside of an acoustic path between the fluid and an acoustic transducer generating the acoustic signal. In some embodiments, the plurality of recesses, grooves, or protrusions are located along and within an acoustic path between the fluid and an acoustic transducer generating the acoustic signal.

In some embodiments, the container includes a multiwell plate, and a vertical sidewall of the at least one vertical sidewall and the bottom correspond to a single well of the multiwall plate.

In some embodiments, the sidewall and the bottom include a plastic. In some embodiments, the plastic is selected from the group consisting of cyclic olefin polymer, cyclic olefin copolymer, polypropylene, and polystyrene.

Under another aspect, a method of characterizing a container configured to hold a fluid includes providing the container. The container can include at least one vertical sidewall; and a bottom coupled to the at least one vertical sidewall, the bottom being configured to receive an acoustic signal, the bottom including a thickness. The method can include receiving a reflection of the transmitted acoustic signal, the reflection having a time of flight through the thickness; identifying the container based on the time of flight; and characterizing an acoustic impedance of the container based on the identification. An example of such a method is provided herein, e.g., with reference to FIG. 6.

Under still another aspect, a system for characterizing a container configured to hold a fluid includes the container. The container can include at least one vertical sidewall; and a bottom coupled to the at least one vertical sidewall, the bottom being configured to receive an acoustic signal, the bottom including a plurality of recesses, grooves, or protrusions thereon or therein. The system also can include an acoustic transducer configured so as to transmit an acoustic signal through the bottom, the plurality of recesses, grooves, or protrusions providing a plurality of times of flight of the acoustic signal through the bottom. The acoustic transducer further can be configured so as to receive a reflection of the transmitted acoustic signal. The system further can include a controller configured so as to characterize an acoustic impedance of the container based on the reflection. Examples of such a system are provided herein, e.g., with reference to FIGS. 2, 3, 4, 5, and 7.

In some embodiments, the system further includes a computer-readable medium. The controller can be configured so as to: retrieve from the computer-readable medium a value characterizing a thickness of the bottom based on the reflection; and characterize the acoustic impedance of the container based on the value characterizing the thickness of the bottom.

In some embodiments, a first subset of the plurality of recesses, grooves, or protrusions includes a first depth providing a first time of flight of the acoustic signal, and a second subset of the plurality of recesses, grooves or protrusions includes a second depth providing a second time of flight of the acoustic signal, the first depth being different from the second depth.

In some embodiments, a first one of the plurality of recesses, grooves, or protrusions includes a different length, aspect ratio, or depth than a second one of the plurality of recesses, grooves, or protrusions.

In some embodiments, the plurality of recesses, grooves, or protrusions include a hydrophobic region configured so as to increase reflection of the acoustic signal. For example, in some embodiments, the plurality of recesses, grooves, or protrusions include a hydrophobic micropillar array.

In some embodiments, the plurality of recesses, grooves, or protrusions are located outside of an acoustic path between the fluid and an acoustic transducer generating the acoustic signal. In some embodiments, the plurality of recesses, grooves, or protrusions are located along and within an acoustic path between the fluid and an acoustic transducer generating the acoustic signal.

In some embodiments, the container includes a multiwell plate, a vertical sidewall of the at least one vertical sidewall and the bottom corresponding to a single well of the multiwall plate.

In some embodiments, the sidewall and the bottom include a plastic. In some embodiments, the plastic can be selected from the group consisting of cyclic olefin polymer, cyclic olefin copolymer, polypropylene, and polystyrene.

Under yet another aspect, a system for characterizing a container configured to hold a fluid includes the container. The container can include at least one vertical sidewall; and a bottom coupled to the at least one vertical sidewall, the bottom being configured to receive an acoustic signal, the bottom including a thickness. The system can include an acoustic transducer configured so as to transmit an acoustic signal through the bottom. The acoustic transducer further can be configured so as to receive a reflection of the transmitted acoustic signal, the reflection having a time of flight through the thickness. The system further can include a controller configured so as to: identify the container based on the time of flight; and characterize an acoustic impedance of the container based on the identification. Examples of such a system are provided herein, e.g., with reference to FIG. 6.

Other Alternative Embodiments

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for acoustically characterizing a container configured to hold a fluid, comprising:
    the container, originating from a mold and comprising
        at least one vertical sidewall,
        a container bottom coupled to the at least one vertical sidewall, the container bottom having an interior side, an exterior side, and a thickness, and
        a plurality of features that comprise acoustically readable recesses, grooves, or protrusions on the exterior side of the container bottom, said features encoding information indicating a characteristic of the container;
    an acoustic transducer for transmitting an acoustic signal toward the container bottom and for receiving a plurality of reflections of the transmitted acoustic signal from the plurality of features,
    wherein the plurality of features is configured such that upon receiving the transmitted acoustic signal, a first subset of the plurality of features generates a reflection having a first time of flight (ToF) and a second subset of the plurality of features generates a reflection having a second ToF; and
    a controller configured to determine a characteristic of the container based on the reflections, wherein (a) the characteristic identifies a location in the mold from which the container originates or (b) the mold is one of a plurality of molds and the characteristic identifies the mold.

2. The system of claim 1, wherein a first one of the plurality of recesses, grooves, or protrusions includes a different length, aspect ratio, or depth than a second one of the plurality of recesses, grooves, or protrusions.

3. The system of claim 1, wherein the features are located outside of an acoustic path between the fluid and the acoustic transducer.

4. The system of claim 1, wherein the features are located along and within an acoustic path between the fluid and the acoustic transducer.

5. The system of claim 1, wherein the container comprises a multiwell plate, and a vertical sidewall of the at least one vertical sidewall and the container bottom correspond to a single well of the multiwell plate.

6. The system of claim 1, wherein the sidewall and the container bottom are comprised of a plastic.

7. The system of claim 6, wherein the features are etched into the plastic.

8. The system of claim 6, wherein the plastic is selected from the group consisting of a cyclic olefin polymer, a cyclic olefin copolymer, polypropylene, and polystyrene.

9. The system of claim 1, wherein the features comprise raised features, recessed features, or both raised features and recessed features.

10. The system of claim 1, further including a fluid in the container.

11. A container configured to hold a fluid, comprising:
    at least one vertical sidewall;
    a container bottom coupled to the at least one vertical sidewall, the container bottom having an interior side, an exterior side, and a thickness; and
    a plurality of features that comprise acoustically readable recesses, grooves, or protrusions on the exterior side of the container bottom for acoustic characterization of the container, the features encoding information indicating a characteristic of the container and configured such that upon receiving an acoustic signal transmitted toward the container bottom, a first subset of the features generates a reflection having a first time of flight (ToF) and a second subset of the features generates a reflection having a second ToF, wherein the first ToF and the second ToF of the reflected acoustic radiation are indicative of the characteristic,
    wherein the container comprises a multiwell plate, and a vertical sidewall of the at least one vertical sidewall and the container correspond to a single well of the multiwell plate.

12. The container of claim 11, wherein a first one of the plurality of recesses, grooves, or protrusions includes a different length, aspect ratio, or depth than a second one of the plurality of recesses, grooves, or protrusions.

13. The container of claim 11, wherein the sidewall and the container bottom are comprised of a plastic.

14. The container of claim 13, wherein the features are etched into the plastic.

15. The container of claim 13, wherein the plastic is selected from the group consisting of a cyclic olefin polymer, a cyclic olefin copolymer, polypropylene, and polystyrene.

16. The container of claim 11, wherein the features comprise raised features, recessed features, or both raised features and recessed features.

17. The container of claim 11, wherein the characteristic identifies (a) a location in a mold from which the container originates or (b) a mold from which the container originates.

* * * * *